(No Model.) 2 Sheets—Sheet 1.

A. V. MESEROLE.
GALVANIC BATTERY.

No. 388,430. Patented Aug. 28, 1888.

Attest
Geo. H. Botts
G. M. Borst

Inventor:
A. V. Meserole
by Philipp Philpp & Hovey
Atty's.

(No Model.) 2 Sheets—Sheet 2.
A. V. MESEROLE.
GALVANIC BATTERY.
No. 388,430. Patented Aug. 28, 1888.
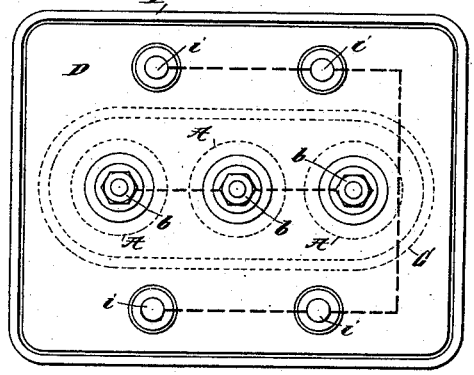
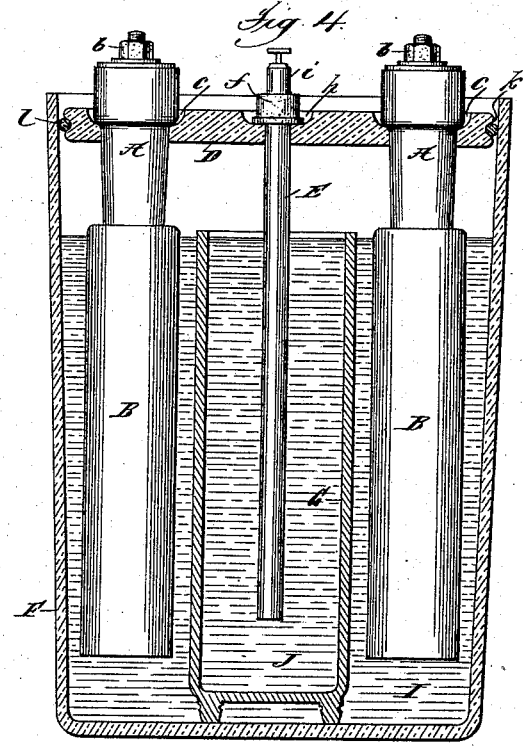
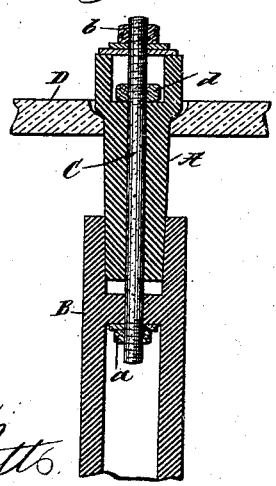
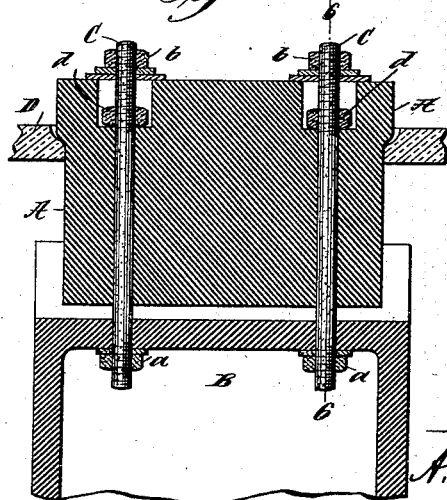

UNITED STATES PATENT OFFICE.

ABRAHAM V. MESEROLE, OF NEW YORK, N. Y.

GALVANIC BATTERY.

SPECIFICATION forming part of Letters Patent No. 388,430, dated August 28, 1888.

Application filed May 18, 1888. Serial No. 274,248. (No model.)

*To all whom it may concern:*

Be it known that I, ABRAHAM V. MESEROLE, a citizen of the United States, residing at New York, county of New York, and State of New York, have invented certain new and useful Improvements in Galvanic Batteries, fully described and represented in the following specification and the accompanying drawings, forming a part of the same.

This invention relates to improvements in what are commonly known as "primary" or "galvanic" batteries, it being the object of my invention to provide a battery which will be normally constant on either open or closed circuit, and also to provide a more perfect terminal contact for the zinc and carbon electrodes of a battery, so as to adapt them for use in connection with many different classes of battery-cells.

To these ends my invention consists of certain electrolytes for use in connection with the carbon and the zinc electrodes, consisting of certain new combinations of chemicals; and my invention further consists of certain features in the construction of the battery and the manner of connecting the carbon and the zinc electrodes in the same, all of which will be hereinafter fully described.

Figure 1:
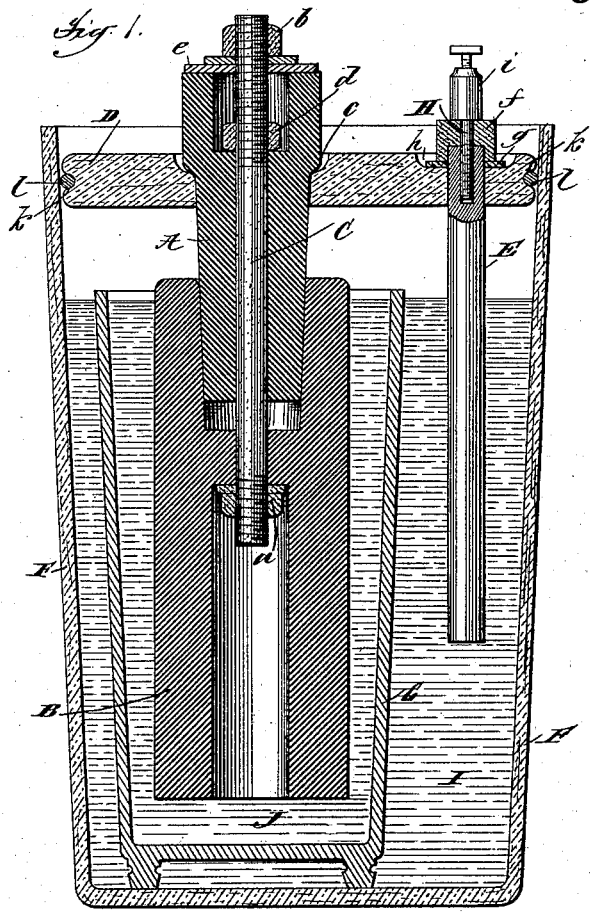
Figure 2:
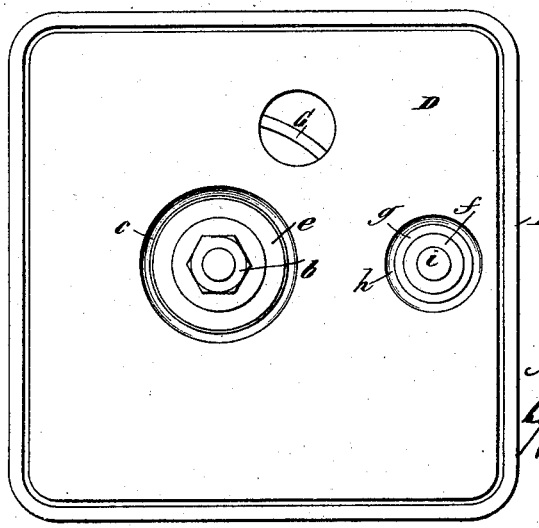

In the drawings forming a part of this application, Figure 1 is a sectional elevation of a battery-cell embodying my improvements. Fig. 2 is a plan or top view of the same. Fig. 3 is a top or plan view, and Fig. 4 a sectional elevation, of two forms of cells to be hereinafter described. Fig. 5 is a vertical section of a portion of a modified form of carbon electrode to be hereinafter described, and Fig. 6 is a section taken on the line 6 6 of Fig. 5.

Referring to the drawings, Figs. 1 and 2 show a battery consisting of an ordinary cell, F, containing a solution, I, formed of sulphate of mercury dissolved in water containing a small proportion of sulphuric acid to render the mercury soluble, so as to keep it in solution during the working of the battery. Suspended in this solution from the cover D of the cell is a zinc electrode, E. Resting on the bottom of this cell is a porous pot, G, containing a solution, J, formed of nitrate of mercury dissolved in water containing a small quantity of nitric acid, which acts to redissolve the mercury as it is precipitated during the action of the battery. Immersed in this solution and suspended from the cover D is a carbon electrode, B.

The electrolytes just described as contained in the cell F and porous pot G are those which I have found to be most effective for my improved form of battery; but it will be understood that many other electrolytes may be used in connection with this battery, though those described are what I consider most preferable.

The form of battery shown in Figs. 1 and 2 will first be described. Referring to said figures, it will be understood that A represents a hollow conducting-plug tapering from its upper portion at the cover D down to its lower end, so as to be adapted to enter and fit closely within a correspondingly-shaped recess formed in the carbon electrode B. The upper portion of the conducting-plug A is provided on its outside with a shoulder adapted to enter and lie in a recess, $c$, formed in the cover D. The plug A and carbon B are secured together by means of a threaded rod, C, of hard rubber or other suitable non-conducting material, which passes through openings in the plug A and the carbon electrode B, and is secured in position by means of nuts and washers $a\ d$. The upper end of the rod C is provided with a nut and washer, $b$, between which and the top of the plug A is placed a platina-faced metal disk, $e$, to which disk leading-out wires may be soldered.

Before placing the plug A in position in the battery-cell it will preferably be boiled in wax, so as to render it moisture-proof, and after being seated in the recess $c$ of the cover and secured therein a small quantity of wax may be melted about its edges, so as to hermetically seal the same. By means of the large surface contact secured by this construction between the conducting-plug A and the carbon electrode B a good conducting-path is provided for the electrical current. This construction also permits the relative size of the conducting-plug A and carbon electrode B to be varied when required to suit different conditions, and by means of this construction, when the carbon electrode B becomes clogged with salt or becomes polarized, so as to be rendered unfit for further use, it may readily be removed and a new electrode inserted in its stead without breaking the top connections.

One of the most important advantages of the construction and manner of supporting the electrode B heretofore described is that salts and moisture are prevented from creeping up around the top connections, thus preventing them from being eaten away and destroyed. At the same time a perfectly reliable and efficient electrical contact is secured.

The zinc electrode E, which may be of any desired form, is provided at its upper end with a cap, $f$, of glass or other non-conducting material, resting upon a washer, $g$, of rubber, seated in a recess, $h$, formed in the cover D. Screwed into the upper end of the zinc electrode E and passing through the washer $g$ and cap $f$ is a metal plug, H, on the upper end of which is fixed a binding-post, $i$, by which the zinc is held firmly in position and the cap $f$ and washer $g$ held down in the recess $h$, so as to form a non-corroding electrical contact. When the zinc electrode and its several connections are placed in position, a small quantity of wax may be melted about their edges, so as to hermetically seal the same, as in the case of the carbon electrode.

The cover D of the battery may be of glass or other suitable material, and will preferably be provided with a groove, $k$, about its edge, as shown in Fig. 1, for receiving a suitable packing material, $l$—such, for example, as rubber—which will form a tight joint between the cover and the sides of the cell and prevent the moisture and salts from creeping up between the two. The cell F may be of pressed glass, and the porous cup G is of the usual form used for what are known as "chemical batteries."

As thus far described the cell has been spoken of as containing but one carbon and one zinc electrode. While for many uses these will be sufficient, yet where a large amount of work is required to be done it will be preferable to increase the size of the cell and to provide it with a larger number of these carbon and zinc electrodes disposed in convenient parallel or concentric positions within the cell. In some cases, also, the size of the electrodes may be increased, so as to obtain stronger currents. I prefer, however, to increase the number of electrodes, as smaller electrodes are much more convenient to manufacture and much better electrical results can be obtained in large work from the use of multiple electrodes than from the use of electrodes of increased size.

In Figs. 3 and 4 I have shown a battery-cell provided with multiple electrodes. Fig. 3 shows a top view of a cell provided with three carbon electrodes suspended in a porous pot of oval form in the center of the cell, and on each side of the porous pot are arranged two zinc electrodes. In Fig. 4 is shown a cell containing two carbon electrodes arranged on opposite sides of a zinc electrode, the zinc electrode being in this case suspended in the porous pot.

Though I have hitherto described the carbon electrodes as suspended in the porous pot, yet it is obvious that the positions of the carbon and the zinc electrodes may be reversed, as shown in Fig. 4; and it will also be obvious that the electrolytes for the carbon and zinc electrodes may also be reversed.

It is to be understood that the conducting-plug A, instead of being round in cross section, may be of any other desired form—as, for example, oval or oblong. In Figs. 5 and 6 is shown a conducting-plug of oblong wedge shape, the carbon electrode having a correspondingly-shaped recess for the reception of the lower end of the plug. The plug and carbon electrode are secured together by two rubber rods, C, the same as already described in connection with Fig. 1.

The mechanical construction which has been described can be employed in connection with any of the ordinary chemicals used in batteries, yet I prefer the electrolytes mentioned in a preceding part of this specification and constituting a part of my invention. My improved electrolyte for the carbon electrode consists of a solution of nitrate of mercury in diluted nitric acid, and for the zinc electrode a solution of mercuric sulphate in dilute sulphuric acid. As before stated, the former solution may be used for the zinc electrode and the latter for the carbon electrode. Each of these solutions is combined in such proportions as to retard the precipitation of the mercury contained in them and to prevent the formation of salts in the cell. The dilute acids used in these solutions render the mercury soluble and promote a regular and constant excitation in the cell when the battery is doing work.

My invention is particularly well adapted to what are known as "electro-medical batteries," but is also applicable to many other forms of batteries.

What I claim is—

1. The combination, with the two electrodes, of two electrolytes for said electrodes, composed, respectively, of sulphate of mercury in dilute sulphuric acid and nitrate of mercury in dilute nitric acid, substantially as described.

2. The combination, with the two electrodes separated by a porous wall, of two electrolytes for said electrodes, composed, respectively, of sulphate of mercury in dilute sulphuric acid and nitrate of mercury in dilute nitric acid, substantially as described.

3. The combination, with a carbon electrode and a zinc electrode, of two electrolytes for said electrodes, composed, respectively, of sulphate of mercury in dilute sulphuric acid and nitrate of mercury in dilute nitric acid, substantially as described.

4. The combination, with the electrode B, having a flaring recess in its upper end, of the tapering conducting-plug A, entering said recess and secured therein, substantially as described.

5. The combination, with the electrode B, having a flaring recess in its upper end, of the tapering conducting-plug A, entering said recess, and the vertical rod C, passing through and securing the two together, substantially as described.

6. The combination, with the electrode B, having a flaring recess in its upper end, of the conducting-plug A, entering said recess, the disk e, located at the upper end of the plug A, and the rod C, passing through and securing the three together, substantially as described.

7. The combination, with the electrode E, of the cap f, of insulating material, seated in a recess formed in the upper side of the cover D and covering the upper end of the electrode, and the rod H, passing through the cap and secured to the electrode, substantially as described.

In testimony whereof I have hereunto set my hand in the presence of two subscribing witnesses.

ABRAHAM V. MESEROLE.

Witnesses:
T. H. PALMER,
G. M. BORST.